United States Patent
Harris et al.

(10) Patent No.: US 7,572,143 B2
(45) Date of Patent: Aug. 11, 2009

(54) INTERFACING BETWEEN A COMPUTER AND AUDIO/VIDEO EQUIPMENT

(75) Inventors: Jonathan R. Harris, Cypress, TX (US); Kevin L. Massaro, Houston, TX (US); Mark C. Solomon, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 11/240,123

(22) Filed: Sep. 30, 2005

(65) Prior Publication Data

US 2006/0288388 A1 Dec. 21, 2006

Related U.S. Application Data

(60) Provisional application No. 60/692,251, filed on Jun. 21, 2005.

(51) Int. Cl.
*H01R 11/00* (2006.01)
(52) U.S. Cl. ........................ 439/502; 439/950
(58) Field of Classification Search ................ 439/502, 439/950
See application file for complete search history.

(56) References Cited

U.S. PATENT DOCUMENTS

| | | | |
|---|---|---|---|
| 5,826,042 A | 10/1998 | Kirkendoll | |
| 6,407,914 B1 | 6/2002 | Helot | |
| 6,496,122 B2 | 12/2002 | Sampsell | |
| 6,530,085 B1 * | 3/2003 | Perlman | 725/82 |
| 6,628,517 B1 | 9/2003 | Helot et al. | |
| 6,765,792 B2 | 7/2004 | Yin et al. | |
| 6,833,989 B2 | 12/2004 | Helot et al. | |
| 2003/0038849 A1 | 2/2003 | Craven et al. | |
| 2003/0060080 A1 | 3/2003 | Rees | |

OTHER PUBLICATIONS

Hewlett-Packard Company, "HP Creates New Notebook PCS and Accessories That Allow People to Enjoy Digital Content at Home or on the Go", Aug. 27, 2004, Publisher: Hewlett-Packerd Company, Published in: Palo Alto, CA.
Hewlett-Packard Company, "HP Enables Simple and Personal Digitla Home Viewing Experience for Consumers", Aug. 27, 2004, Publisher: Hewlett-Packard Company, Published in: Palo Alto, CA.
Hewlett-Packard Development Company L.P., "Powerful New Line of HP Pavilion Notebooks Offers Consumers the Technology to Experience More", Jan. 7, 2004, Publisher: Hewlett-Packard Company, Published in: Palo Alto, CA.
Hewlett-Packard Company, "Xc1000 All-In-One Media Cable", "http://host.jwcinc.net/2302140/allinonehp.jpg", Oct. 10, 2006, Publisher: Hewlett-Packard Company.
Hewlett-Packard Development Company L.P., "HP XC2000 Notebook All-In-One Media Cable and HP Mobile Remote Control", Aug. 2004, Publisher: Hewlett Packard Company, Published in: Palo Alto, CA.

\* cited by examiner

*Primary Examiner*—Javaid Nasri (57) ABSTRACT

Embodiments for interfacing between a computer and audio/video equipment are provided. One embodiment comprises a cable that includes a docking cable having a docking connector for communicating signals to and from a computer, an output cable, the output cable having at least one audio/video connector, and an interface module. The interface module is coupled to the docking cable and the output cable. The interface module includes at least one infrared receiver for receiving input to be transmitted to the computer over the docking cable. The interface module provides a path for communicating signals from the docking cable to the at least one audio/video connector. Other embodiments comprise media cables, docking stations and cable management devices that enable interfacing between a computer and audio/video equipment.

5 Claims, 8 Drawing Sheets

INTERFACING BETWEEN A COMPUTER AND AUDIO/VIDEO EQUIPMENT

RELATED APPLICATIONS

This application claims the benefit of prior provisional patent application Ser. No. 60/692,251, filed Jun. 21, 2005, which is incorporated herein by reference.

BACKGROUND

Portable computers provide high performance data processing in a compact package that is easy to transport. Most portable computers include an integral screen and speakers. With appropriate software, portable computers produce various forms of audio and video output traditionally associated with other electronic equipment, e.g., video players, televisions, video games, and audio players.

Unfortunately, screens and speakers of a typical portable computer pale in comparison to dedicated audio/video equipment available on the market. The speakers and screens of the portable computers are typically lower quality than stand alone audio/video components, e.g., plasma screens, televisions, flat screens, monitors, audio/video (a/v) receivers and amplifiers, and other speaker systems. Many devices have been developed to connect portable computers to higher quality audio/video equipment. However, due to the wide variety of data formats and interfaces that are available, such devices typically are limited to a particular type of audio/video equipment and computer. Further, most audio/video equipment is typically designed for use with media other than a portable computer. Thus, connecting the computer to the audio/video equipment is often cumbersome and awkward. Once connected, it is often difficult to use the computer with the same degree of freedom associated with operation of conventional audio/video equipment.

Therefore, there is a need for improvements in interfacing between computers and audio/video equipment.

DETAILED DESCRIPTION

In the following detailed description, reference is made to the accompanying drawings which form a part hereof, and in which is shown by way of example specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

I. Cable for Interfacing a Computer with Audio/Video Equipment

Figure 1A:
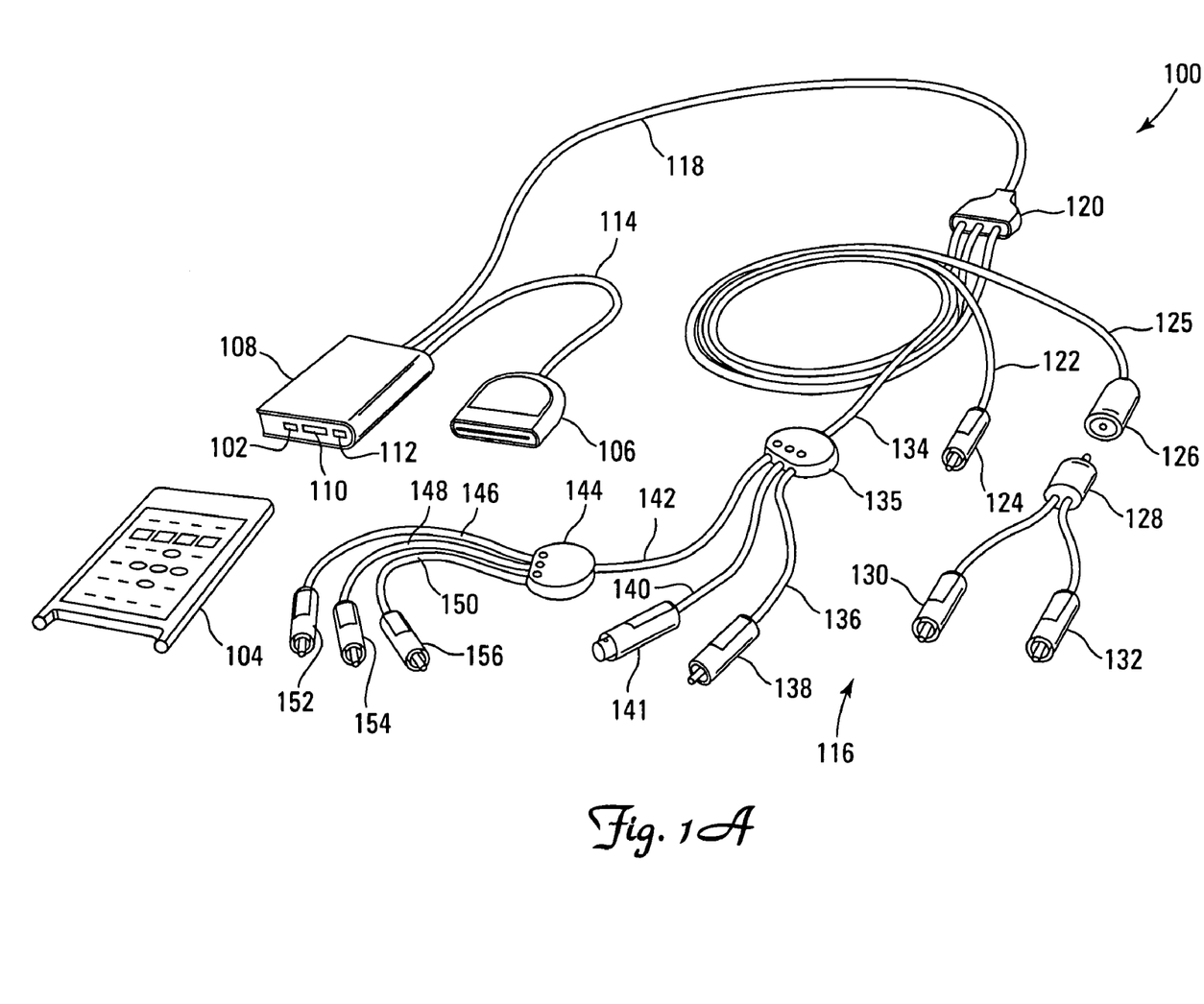
FIG. 1a is a perspective view of one exemplary embodiment of a cable, including a positionable infrared receiver, for interfacing between a computer and audio/video equipment.
Figure 1B:
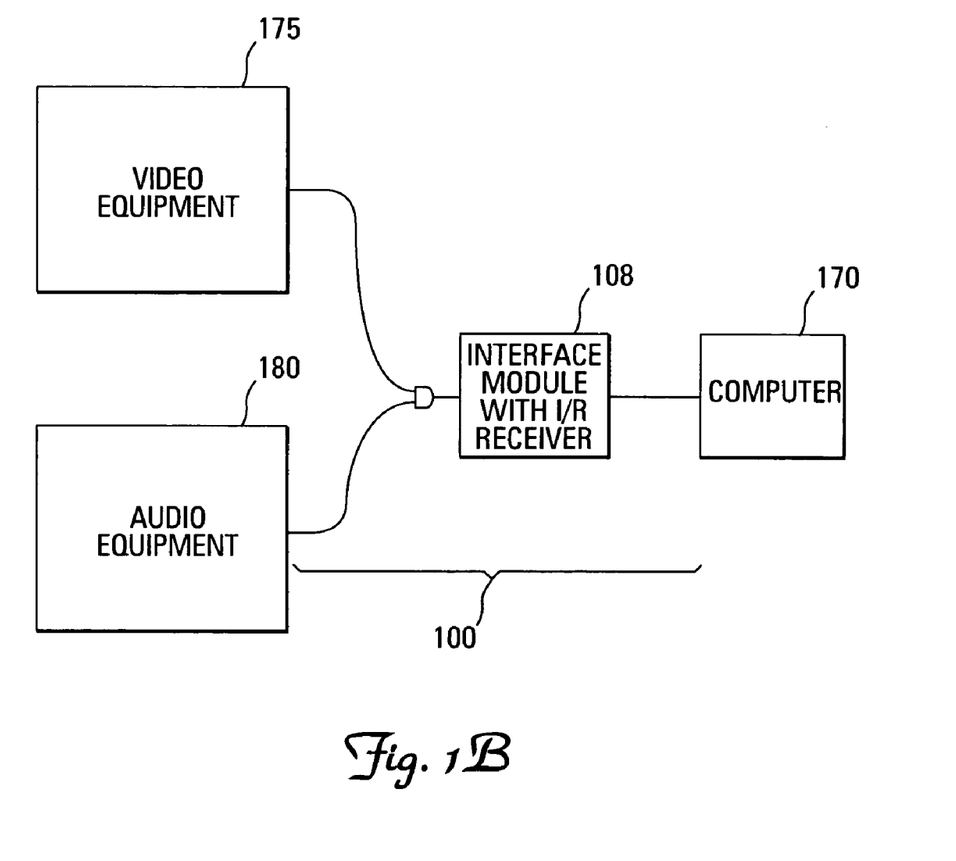
FIG. 1b is a block diagram of one exemplary embodiment of a system that includes the cable of FIG. 1a for interfacing between a computer and audio/video equipment in accordance with the invention.

FIG. 1a is a perspective view of one exemplary embodiment of a media cable, indicated generally at 100, with a positionable infrared receiver 102 and remote control 104. As shown in FIG. 1b, cable 100 provides an interface between a computer 170, e.g., a portable computer, and video equipment 175 and audio equipment 180 such as a plasma screen, a television, an audio/video receiver and amplifier, and other audio and video equipment. It is noted that in FIG. 1b the audio and video equipment is shown as separate entities. In other embodiments, video equipment 175 and audio equipment 180 are integrated into a single unit. In other embodiments, audio equipment 180 comprises a plurality of units including separate speakers, receiver and amplifier units.

Cable 100 enables various forms of media, e.g., still images, audio, and video, that are stored on the computer 170 to be played or displayed on the audio equipment 180 and the video equipment 175. For example, cable 100 enables displaying of a movie stored on the computer 170 to be viewed on video equipment 175, e.g., a connected television, with the sound broadcast on audio equipment 180, e.g., an accompanying sound system. Embodiments in accordance with the invention thus improve the quality of the entertainment experience for the user of the computer 170.

Returning to FIG. 1a, cable 100 includes an interface to the computer. In the embodiment of FIG. 1a, the interface comprises a docking connector 106. Docking connector 106 is a multi-pin connector. Each pin communicates input and/or output signals for the computer. For example, in one embodiment, docking connector 106 of FIG. 1a communicates the following types of signals to and from the computer: composite video, composite TV, S-video, analog audio, digital audio, Infrared signals, docking signals, power, Universal Serial Bus (USB), and FireWire signals according to the IEEE 1394 or 1394b standard. In other embodiments, other appropriate signals, standard or proprietary, are passed over the docking interface 106 between cable 100 and the associated computer.

Cable 100 includes interface module 108. Interface module 108 includes a housing that houses infrared receiver 102. Interface module 108 also includes any of a number of other ports associated with computers. For example, as shown, this embodiment of interface module 108 includes USB port 110 and FireWire port 112. In other embodiments, interface module 108 includes any other appropriate data ports, e.g., an RJ-11 jack, RJ-45 jack, or other existing or later developed, standard or proprietary data connector. Interface module 108 is coupled to docking connector 106 over docking cable 114.

Cable 100 also includes an output cable or audio/video cable indicated generally at 116. Output cable 116 provides a plurality of standard audio/video interfaces for cable 100. Thus, cable 100 is enabled to interconnect the computer with a plurality of types of audio/video equipment. In this example, output cable 116 includes a common portion 118 that extends from interface module 108. Common portion 118 carries both video and audio signals away from the computer.

Output cable 116 also includes a splitter 120 that terminates the common portion 118 of output cable 116. Splitter 120 splits the video signals from the audio signals. The splitter 120 is positioned at a point in output cable 116 to enable use of cable 100 with audio equipment 180 that is spaced apart by a distance from the video equipment 175. For example, the audio equipment 180 may comprise a stereo system and may reside in a location in a room that is a distance away from video equipment 175, e.g., a television or monitor. By splitting audio and video signals at splitter 120, cable 100 is enabled to provide sufficient cable length beyond splitter 120 to reach the separated audio and video equipment without the use of excessive amounts of cable.

On the audio branch, splitter 120 provides two audio outputs. In this embodiment, this includes a first audio cable 122 that provides a digital audio interface according to the Sony/Philips Digital Interface (S/PDIF) standard. In one embodiment, cable 122 terminates in an RCA connector 124 that provides the output audio in the S/PDIF format. The second audio cable 125 provides analog audio output. Second audio cable 125 terminates in audio connector 126. In some embodiments, an additional splitter 128 is provided. Splitter 128 plugs into connector 126 to split the analog audio signal into left and right audio signals. The left audio signal is provided through RCA connector 130 and the right audio signal is provided through RCA connector 132. In other embodiments, the splitter 128 is integral with audio cable 125.

On the video branch, splitter 120 passes video signals in three formats to video cable 134. In other embodiments, splitter 120 passes video signals in any appropriate number of standard or proprietary formats. Video cable 134 is terminated in splitter 135 that provides the three-way split in video signals. In this embodiment, video signals in the composite TV format are provided on video cable 136 to RCA connector 138. Further, video signals in the S-Video format are provided on video cable 140 to S-Video connector 141. Video cable 142 carries video signals between splitter 135 and splitter 144. Splitter 144 splits the video signal for transmission on video cables 146, 148, and 150. Video cables 146, 148, and 150 terminate, respectively, in RCA connectors 152, 154, and 156 providing Y, Pr, and Pb component video signals.

In operation, cable 100 carries signals between a computer 170 and connected audio/video equipment, e.g., video equipment 175 and audio equipment 180 as shown in FIG. 1b. Docking connector 106 is coupled to the computer 170. Remote control 104 is used to send signals to the computer via infrared receiver 102. Infrared receiver 102 passes these signals to the computer 170 over cable 114 and docking connector 106. In response to the signals, the computer 170 provides selected audio and video signals over the cable 100. For example, when an MPEG video is selected to be played on a monitor with an S-video input, cable 100 carries the video signal over cable 114, through interface module 108, to cable 118. From cable 118, the video signal travels through splitter 120 to video cable 134, splitter 135, cable 140 and terminates at the monitor in S-video connector 141. The corresponding audio signal is split off at splitter 120 and is provided either as digital audio on cable 122 or analog audio on cable 124.

Figure 2:
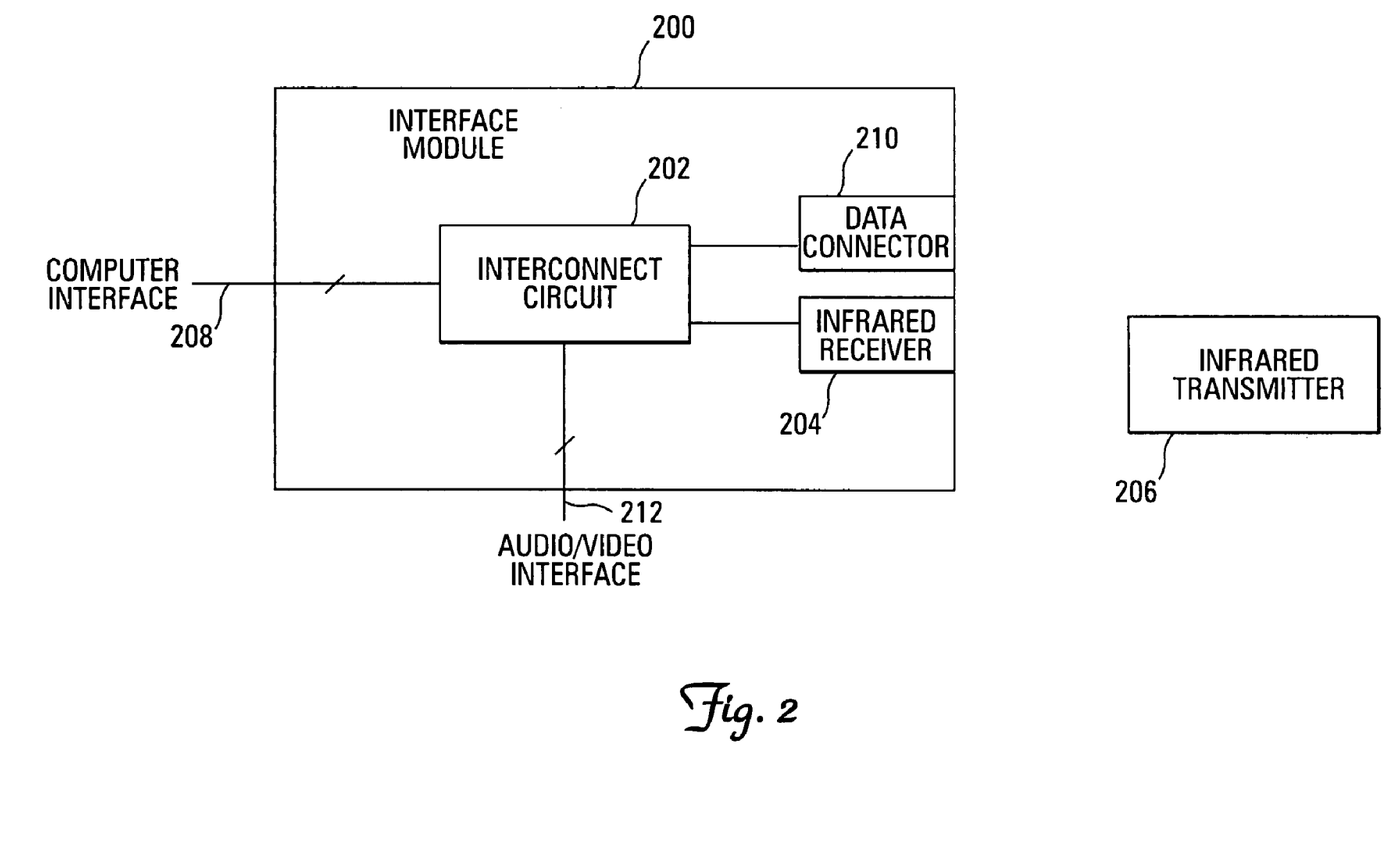
FIG. 2 is a block diagram of one exemplary embodiment of an interface module for use in the cable of FIG. 1a in accordance with the invention.

FIG. 2 is a block diagram of one embodiment of an interface module, indicated generally at 200, for use as interface module 108 in the cable 100 of FIG. 1a. Interface module 200 includes interconnect circuit 202 that serves to provide connections between the various interfaces of interface module 200. In one embodiment, interconnect circuit 202 comprises a printed circuit board with appropriate traces formed on and in the printed circuit board to route signals through the interface module 200. Interconnect circuit 202 is coupled to infrared receiver 204. Infrared receiver 204 is adapted to receive commands for an attached computer. The infrared receiver 204 passes the signals received from infrared transmitter 206 to the computer interface 208 through interconnect circuit 202. In some embodiments, interface module 200 also includes other data ports coupled to interconnect circuit 202. For example, in some embodiments, interface module 200 also includes one or more optional data connectors 210, e.g., a Universal Serial Bus (USB) connector, a FireWire connector or other standard or proprietary data connector that provides data in a format readable by the computer. Interconnect circuit 202 also includes audio/video interface 212. Through audio/video interface 212, interface module 200 provides audio/video signals for connected equipment.

Figure 3:
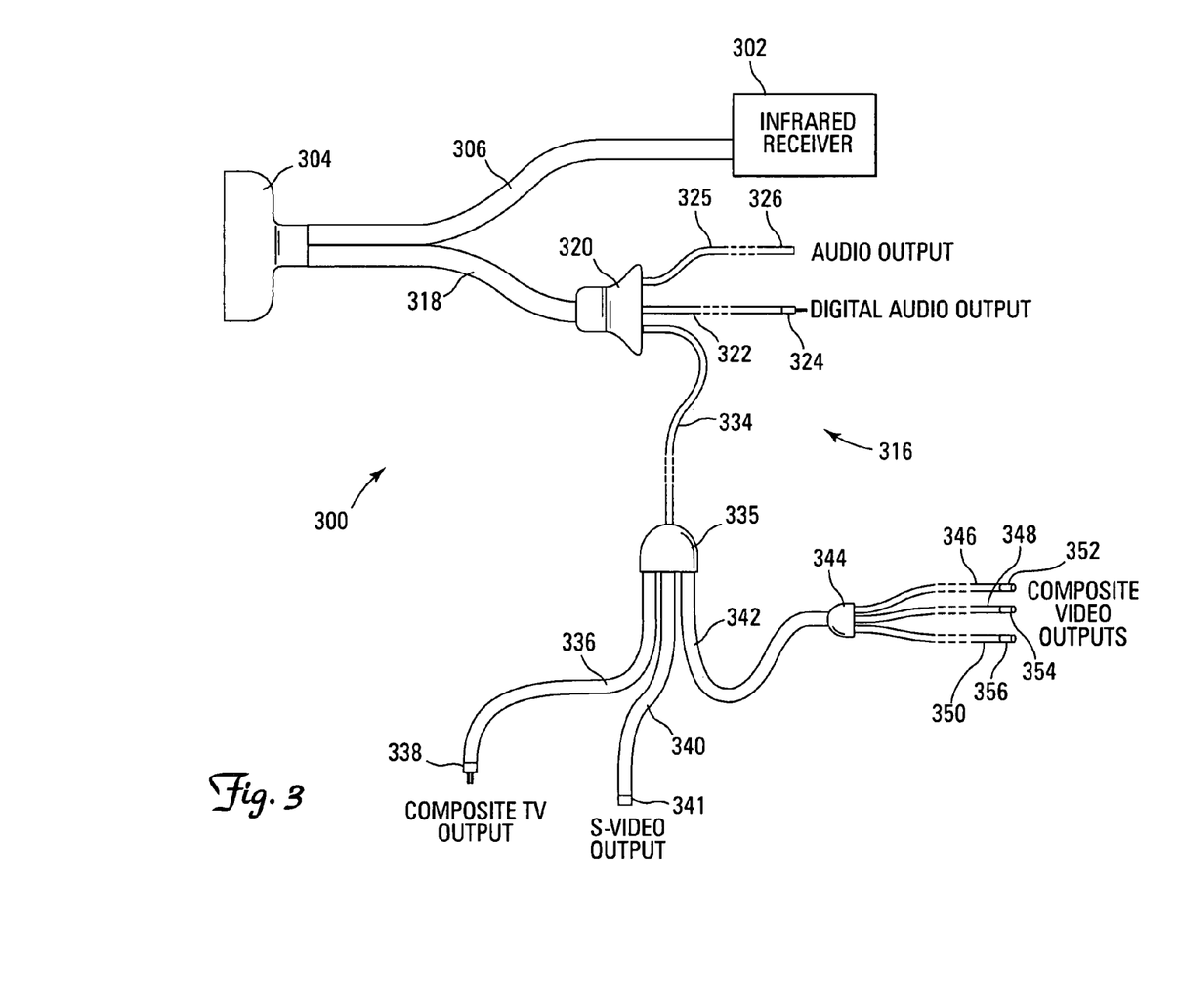
FIG. 3 is a plan view of another exemplary embodiment of a cable with a positionable infrared receiver in accordance with the invention.

FIG. 3 is a perspective view of another embodiment of a media cable, indicated generally at 300, with a positionable infrared receiver 302. Media cable 300 provides an interface between a computer and multimedia equipment such as a television and other audio and video equipment. Media cable 300 allows various forms of media, e.g., still images, audio, and video, that are stored on the computer to be played or displayed on the audio/video equipment. For example, media cable 300 enables a movie stored on the computer to be viewed on a connected television with audio played on an accompanying sound system. This improves the quality of the entertainment experience for the user of the computer.

Media cable 300 includes an interface to the computer. In the embodiment of FIG. 3, the interface comprises a docking connector 304. Docking connector 304 is a multi-pin connector. Docking connector 304 communicates the following types of signals to and from the computer: composite video, composite TV, S-video, analog audio, digital audio, Infrared signals, and docking signals. In other embodiments, power, Universal Serial Bus (USB), and FireWire signals according to the IEEE 1394 or 1394b standard are also provided. In further embodiments, other appropriate signals, standard or proprietary, are passed over the docking connector 304 between cable 300 and the associated computer.

Media cable 300 includes two main branches. Receiver cable 306 couples docking connector 304 to infrared receiver 302. Receiver cable 306 provides signals to the computer from a remote control. Media cable 300 also includes an output cable or audio/video cable indicated generally at 316. Output cable 316 provides a plurality of standard or proprietary audio/video interfaces for media cable 300. Thus, media cable 300 is enabled to interconnect the computer with a plurality of types of audio/video equipment. In this example, output cable 316 includes a common portion 318 that extends from docking connector 304. Common portion 318 carries both video and audio signals away from the computer.

Output cable 316 also includes a splitter 320 that terminates the common portion 318 of output cable 316. Splitter 320 splits the video signals from the audio signals. The splitter 320 is positioned at this point in output cable 316 to enable use of media cable 300 with audio equipment that is spaced apart by a distance from video equipment in the manner described above with respect to FIG. 1a.

On the audio side, splitter 320 provides two audio outputs. In this embodiment, this includes a first audio cable 322 that provides a digital audio interface according to the Sony/Philips Digital Interface (S/PDIF) standard. In one embodiment, cable 322 terminates in an RCA connector 324 that provides the output audio in the S/PDIF format. The second audio cable 325 provides analog audio output. Second audio cable 325 terminates in audio connector 326. In some embodiments, an additional splitter is provided to split the analog audio into left and right components as described above with respect to FIG. 1a.

On the video side, splitter 320 passes video signals in three formats to video cable 334. Video cable 334 is terminated in splitter 335 that provides the three-way split in video signals. In this embodiment, video signals in the composite TV format are provide on video cable 336 to RCA connector 338. Further, video signals in the S-Video format at provided on video cable 340 to S-Video connector 341. Video cable 342 carries video signals to between splitter 335 and splitter 344. Splitter 344 splits the video signal for transmission on component video cables 346, 348, and 350. Video cables 346, 348, and 350 terminate, respectively, in RCA connectors 352, 354, and 356 providing Y, Pr, and Pb component video signals.

II. Docking Station

Figure 4:
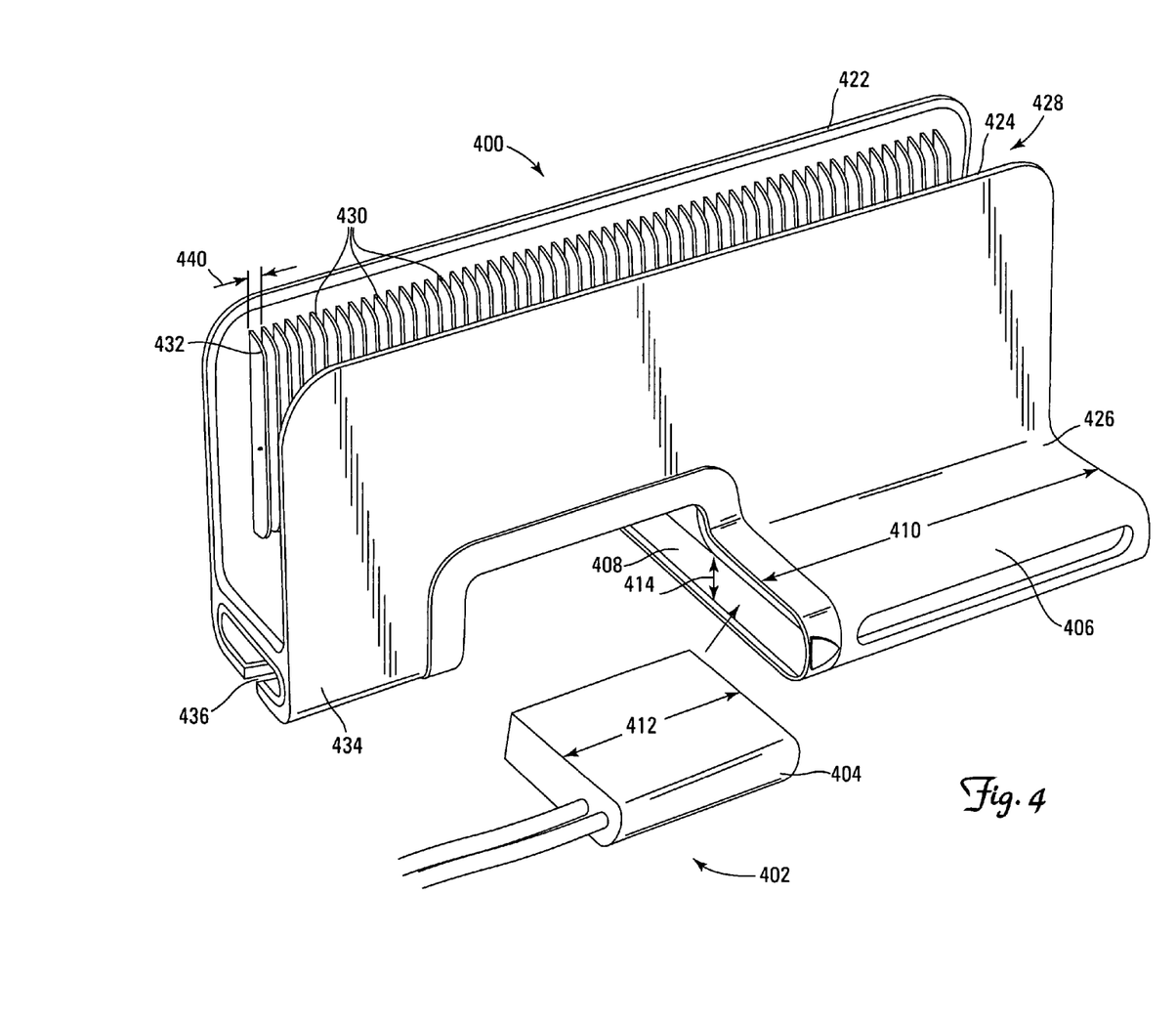
FIG. 4 is a perspective view of an exemplary embodiment of a docking station for use with a cable for interfacing between a computer and audio/video equipment in accordance with the invention.
Figure 5:
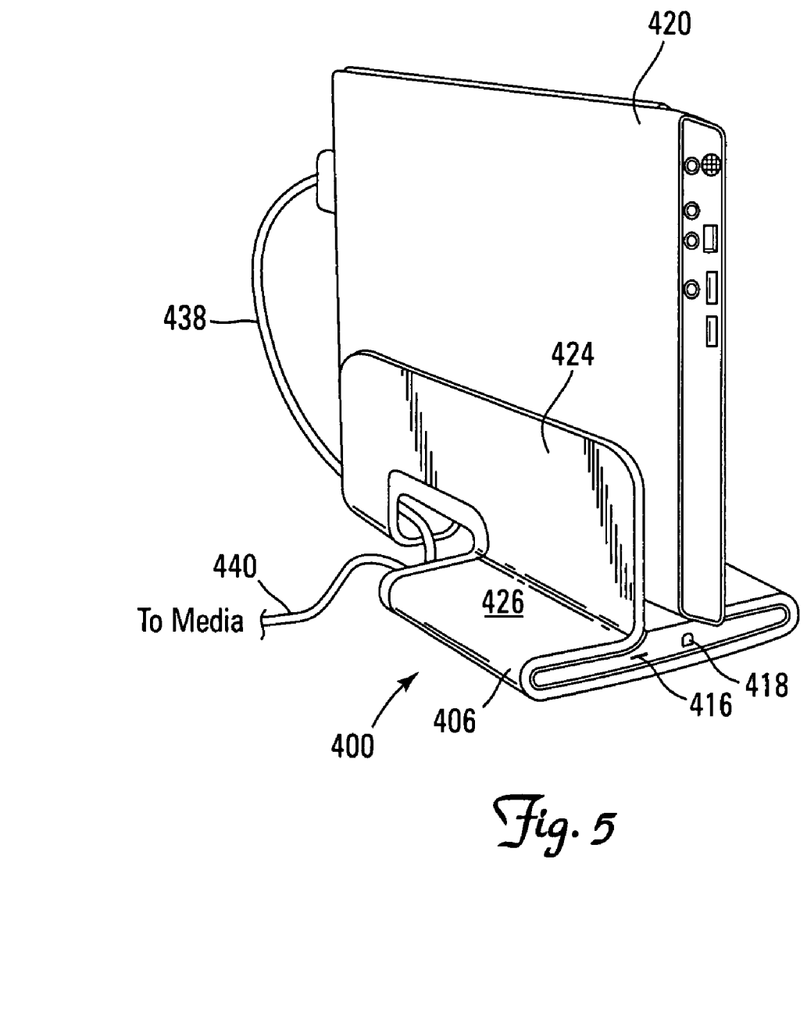
FIG. 5 is another perspective view of the exemplary embodiment of the docking station of FIG. 4 with a computer disposed in the docking station in accordance with the invention.
Figure 6:
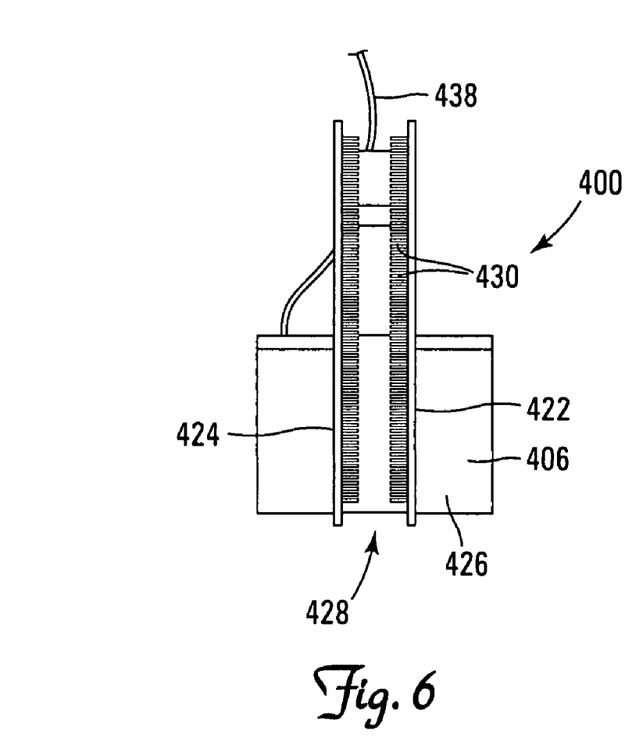
FIG. 6 is a top view of the exemplary embodiment of the docking station of FIG. 4 in accordance with the invention.

FIGS. 4, 5, and 6 are views of an embodiment of a docking station, indicated generally at 400, for use with a cable 402 having a positionable infrared receiver module 404. Docking station 400 includes an elongate base 406 that includes an opening 408 for receiving the module 404. Base 406 has a depth, indicated at 410. In one embodiment, depth 410 is at least as long as the depth of module 404, indicated at 412. Further, the opening 408 has a height 414 that is at least tall enough to receive module 404. As seen in FIG. 5, a front panel 416 of module 404 is exposed in opening 408 of base 406. This enables infrared receiver 418 to receive infrared signals for the control of computer 420, e.g., a portable computer such as a notebook computer, or tablet computer or palm top computer.

Returning to FIG. 4, base 406 also includes a mechanism for receiving the computer 420. This mechanism includes a pair of walls 422 and 424 that extend from a top surface 426 of base 406 to form a slot 428. Walls 422 and 424 are substantially parallel with one another. Slot 428 has a width that is sufficient to receive a computer 420. As shown, computer 420 is inserted into slot 428 in a closed position. Slot 428 is substantially perpendicular to base 406.

Slot 428 is lined with a plurality of ribs 430. As shown, ribs 430 do not extend the full height of walls 422 and 424. In other embodiments, ribs 430 extend to the top of walls 422 and 424. Ribs 430 also include a rounded top 432 and are spaced apart by a distance indicated at 440. Further, in some embodiments, ribs 430 are formed of a flexible foam material. The rounded top, spacing and materials used to form ribs 430 enable docking station 400 to be used with portable computers having a range of thicknesses.

Docking station 400 also includes a rear base 434. Rear base 434 is positioned below, and provides support to, walls 422 and 424 of slot 428. Rear base 434 also includes a cable management slot 436. As shown in FIGS. 5 and 6, cable management slot 436 receives and directs at least a portion of cable 402. For example, as seen in FIG. 5, cable management slot 436 directs docking cable 438 of cable 402 to a position to be coupled to computer 420.

In operation, docking station 400 enables computer 420 to be positioned with respect to audio/video equipment to provide convenient and effective access to the media stored on the computer. Computer 420 is placed in slot 428 with the computer 420 in a closed position. Module 404 of cable 402 is placed in opening 408 of elongate base 406 with infrared receiver 418 exposed to view. Docking cable 438 is coupled to computer 420 through cable management slot 436 and audio/video cable 440 is coupled to appropriate audio/video equipment. In this configuration, a user is enabled to control playing of media stored on the computer on the audio/video equipment using a remote control through infrared receiver 418 of cable 402.

III. Media Cable with Cable Management Device

Figures 7, 8:
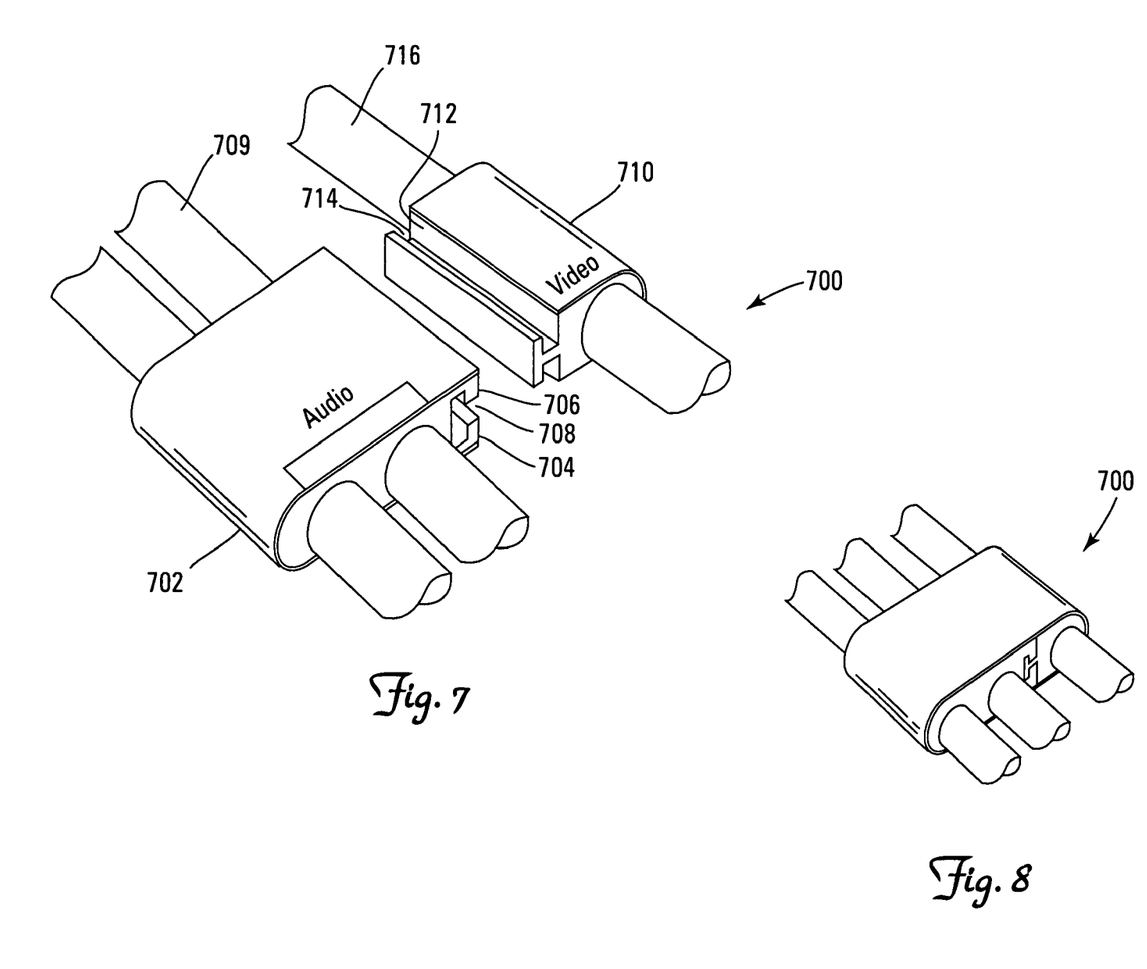
FIG. 7 is a perspective view of an exemplary embodiment of a cable management device with the cable management device in a disengaged position in accordance with the invention.
FIG. 8 is another perspective view of the exemplary embodiment of the cable management device of FIG. 7 with the cable management device in an engaged position in accordance with the invention.

FIGS. 7 and 8 are perspective views of an embodiment of a cable management device indicated generally at 700. Cable management device 700 enables separate cables to be grouped together or separated at a user's discretion.

Cable management device 700 includes member 702 with a slot 704 formed along at least a portion of a length of side 706 with an opening 708 in the form of a letter "T." Member 702 is coupled to one or more cables 709. In some embodiments, cables 709 pass through member 702. In one embodiment, cables 709 comprise audio cables of a cable that interfaces between a computer and audio/video equipment.

Cable management device 700 also includes another member 710 with a tongue 712 formed along the length of a side 714 with the tongue having a "T" cross-section. Member 710 is coupled to one or more cables 716. In some embodiments, cables 716 pass through member 710. In one embodiment, cables 716 comprise at least one video cable of a cable that interfaces between a computer and audio/video equipment.

In operation, cable management device 700 enables cables to be grouped together by a user, e.g., audio cables grouped with video cables. As shown in FIG. 7, cables 709 and 716 are not grouped together. To group cables 709 and 716, a user inserts tongue 712 of member 710 into an end of opening 708 of slot 704 of member 702. The user slides the tongue 712 into the slot 704 until the tongue is fully inserted into slot 704 to make a flush joint. This effectively groups cable 716 with cable 709 as shown in FIG. 8.

Figure 9:
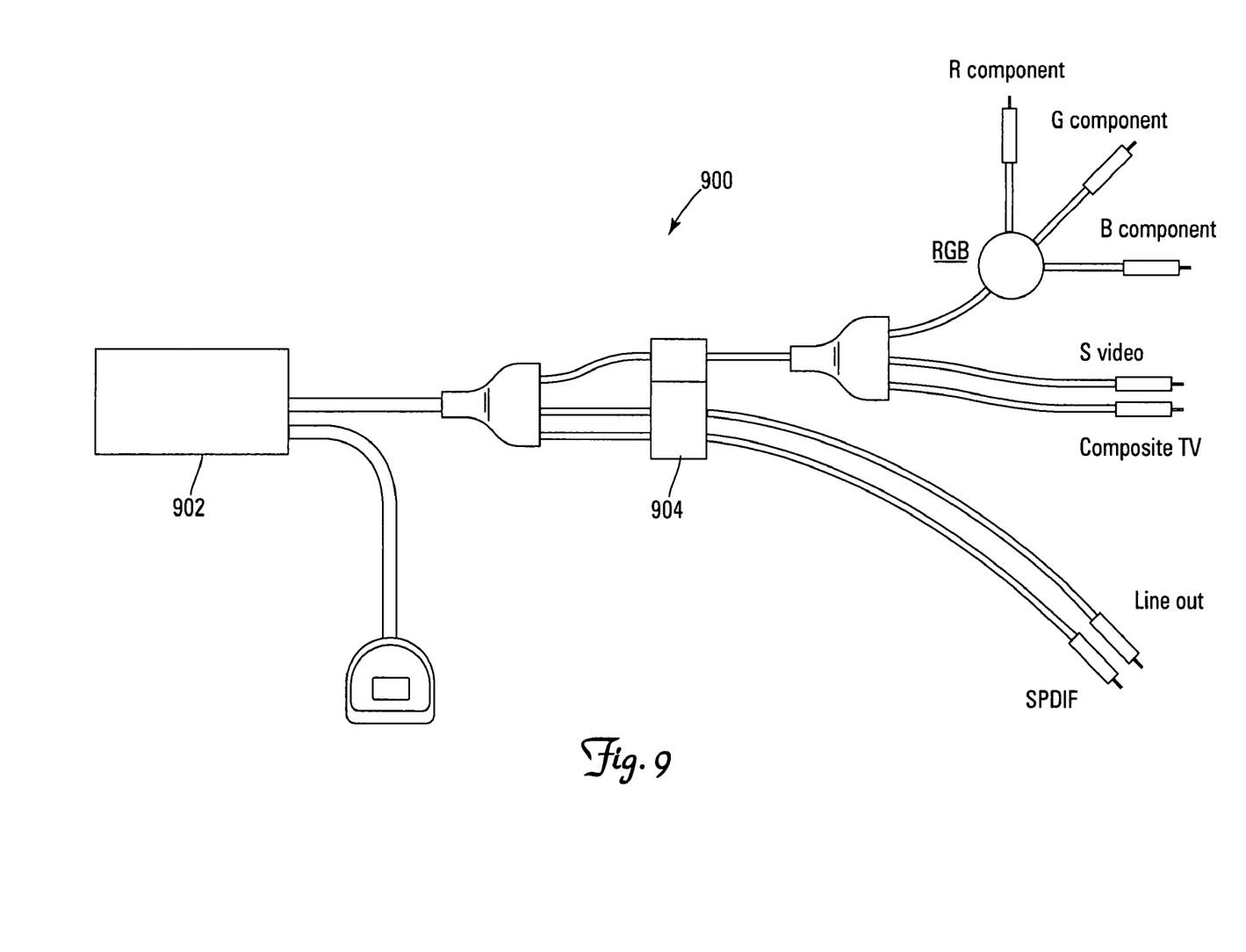
FIG. 9 is a plan view of another exemplary embodiment of a cable, having a positionable infrared receiver, for interfacing between a computer and audio/video equipment in accordance with the invention.

FIG. 9 is a plan view of another embodiment of a cable, indicated generally at 900, with a positionable infrared receiver 902 and a cable management device 904. Cable 900 is constructed in a similar manner as cable 100 of FIG. 1a with the addition of cable management device 904. In one embodiment, cable management device 904 is constructed in the manner described above with respect to FIGS. 7 and 8.

What is claimed is:

1. A cable for interfacing between a computer and audio/video equipment, the cable comprising:
   a docking connector for communicating signals to and from a computer;
   an output cable coupled to the docking connector, the output cable having at least one audio/video connector, for communicating output signals from the computer to audio/video equipment;
   where the output cable includes at least one splitter positioned intermediate the docking connector and the at least one audio/video connector, the splitter for passing audio signals to at least one audio cable and video signals to at least one video cable;

a cable management device with a first member coupled to the at least one audio cable and a second member coupled to the at least one video cable, where the first member of the cable management device has a tongue, and the second member of the cable management device has a slot for receiving the tongue of the first member to make a flush joint; and an infrared receiver coupled to the docking connector for communicating input signals to the computer.

2. The cable of claim 1, wherein the at least one audio/video connector comprises at least one of a component video connector, an S-video connector, a composite television connector, an audio connector, and a digital audio connector.

3. The cable of claim 1, wherein the infrared receiver is adapted to fit in an opening of a docking station.

4. The cable of claim 1, wherein the at least one video cable includes a video splitter coupled to a plurality of video cables extending from the video splitter, each video cable terminating in at least one connector for delivering video in a selected format.

5. The cable of claim 4, wherein one of the at least one video cables includes a splitter that divides the video signal for a plurality of component video cables.

* * * * *